US012606019B2

(12) United States Patent
Pesola et al.

(10) Patent No.: US 12,606,019 B2
(45) Date of Patent: Apr. 21, 2026

(54) ELECTRIC TRACTION AXLE/BEAM

(71) Applicant: FPT INDUSTRIAL S.P.A., Turin (IT)

(72) Inventors: Fabio Pesola, Turin (IT); Marco Tessitore, Turin (IT); Francesco Cantone, Turin (IT); Pietro Esposito, Turin (IT); Emanuele Colacito, Turin (IT); Domenico Feola, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 18/926,879

(22) Filed: Oct. 25, 2024

(65) Prior Publication Data

US 2025/0128596 A1      Apr. 24, 2025

(30) Foreign Application Priority Data

Oct. 20, 2023     (IT) ........................ 102023000021978

(51) Int. Cl.
| | |
|---|---|
| *B60K 17/16* | (2006.01) |
| *B60K 17/04* | (2006.01) |
| *B60K 1/00* | (2006.01) |

(52) U.S. Cl.
CPC ............ *B60K 17/16* (2013.01); *B60K 17/046* (2013.01); *B60K 2001/001* (2013.01)

(58) Field of Classification Search
CPC ...... B60K 17/16; B60K 17/046; B60K 17/02; B60K 17/08; B60K 2001/001; B60K 1/00; F16H 3/663; F16H 3/54; F16H 48/24; F16H 2200/0021; F16H 2200/0034; F16H 2200/2005; F16H 2200/2035; F16H 2200/2064; F16H 2200/2094; F16H 2200/2097; B60Y 2200/14; B60Y 2200/91; B60B 35/12
See application file for complete search history.

(56) References Cited

U.S. PATENT DOCUMENTS

| | | | |
|---|---|---|---|
| 11,667,189 B1 * | 6/2023 | Engerman | ............. F16H 37/082 |
| | | | 475/204 |
| 2018/0080536 A1 | 3/2018 | Nilson | |
| 2019/0283566 A1 * | 9/2019 | Nilsson | .................... B60K 6/48 |
| 2019/0285175 A1 * | 9/2019 | Tanaka | ................... F16H 63/48 |

(Continued)

FOREIGN PATENT DOCUMENTS

| | | |
|---|---|---|
| CN | 109910605 A | 6/2019 |
| DE | 102018004500 A1 | 1/2019 |
| EP | 4238797 A1 | 9/2023 |

OTHER PUBLICATIONS

Italian Search Report and Written Opinion in IT Application No. 202300021978, mailed Jun. 17, 2024, an English Translation attached hereto (21 pages).

*Primary Examiner* — Farhana Pervin
(74) *Attorney, Agent, or Firm* — Leason Ellis LLP

(57)     ABSTRACT
An electric traction axle/beam, e-axle/e-beam, for a vehicle comprising at least one electric machine, a pair of drive shafts each connected to a respective wheel of the vehicle and a transmission chain operatively connecting the electric machine to the pair of drive shafts,
    the transmission chain comprising a first transfer system, a second transfer system, and a differential unit operationally interposed in series between them,
    the drive shafts being coaxial to a longitudinal axis of the axle, the electric machine being subtended by a parallel and separate axis of the longitudinal axis.

11 Claims, 14 Drawing Sheets

(56)  References Cited

U.S. PATENT DOCUMENTS

| | | | |
|---|---|---|---|
| 2020/0096084 A1* | 3/2020 | Engerman | F16H 3/006 |
| 2020/0282827 A1 | 9/2020 | Kaltenbach et al. | |
| 2021/0276409 A1* | 9/2021 | Devreese | B60K 17/06 |
| 2022/0065334 A1 | 3/2022 | Martin et al. | |
| 2022/0134855 A1* | 5/2022 | Zhang | B60K 1/00 |
| | | | 180/65.1 |
| 2022/0250457 A1 | 8/2022 | Glückler et al. | |
| 2023/0167898 A1* | 6/2023 | Li | F16H 48/24 |
| | | | 192/219.5 |
| 2024/0408958 A1* | 12/2024 | Van Der Vecht | F16H 37/082 |

* cited by examiner

ELECTRIC TRACTION AXLE/BEAM

CROSS-REFERENCE TO RELATED APPLICATIONS

This patent application claims priority from Italian patent application no. 102023000021978 filed on Oct. 20, 2023, the entire disclosure of which is incorporated herein by reference.

TECHNICAL SECTOR

This invention relates to a vehicle axle/beam.

The preferred, though not exclusive, application of this invention is an electric traction axle/beam, a so-called "e-axle" or "e-beam". This application will be referred to below by way of example.

PRIOR ART

As known, there is an increasing need to reduce polluting emissions due to internal combustion engines used to operate vehicles, in particular to enable their traction.

This need is even greater for Light Commercial Vehicles (LCV), Medium Commercial Vehicles (MCV), or Heavy Commercial Vehicles (HCV), such as lorries, as well as motor vehicles in general.

To this end, there are known solutions: e-axles or e-beams, i.e. electric traction axles or beams, wherein the axle/beam supports one or more electric machines configured to exchange torque with the drive shafts of the axle and, therefore, with the wheels, to provide or generate power as a function of the vehicle's use.

More specifically, it should be noted that the axle is the component that connects the two wheel hubs that perform a support function only, while a beam is the component that connects the two wheel hubs where there are also drive shafts and the differential assembly and an input point for traction torque.

Examples of these e-axles are illustrated in the patents US2022/0250457 A1, US 2020/0282827 A1 and US2022/0065334 A1.

These solutions involve the use of electric machines in a so-called "on-axis" configuration where, in other words, the axis of the electric machine is coaxial to the axis of the axle/beam drive shafts.

This configuration, though advantageous in terms of assembling the elements directly on the axles themselves, is particularly disadvantageous in terms of the dimensions along this axial direction.

In fact, the positioning of the electric machine, which is particularly bulky, limits the positioning of other functional elements, unless the longitudinal dimension of the axle is increased.

Since it is not always possible, due to the dimensions of components already present on the axle (suspension, brake system components, frame components, the axle track limit, etc.), to increase this extension, the transmission connecting the electric machine to the wheels or the electric machine itself must be resized, thus actually decreasing the power and performance available to the axle or beam.

Thus, the versatility of torque and power provision over an extended interval, an essential feature for providing an e-axle or e-beam that can be used in diverse vehicle operating conditions, is undermined.

There is, thus, a need to provide e-axles or e-beams that may have reduced dimensions, while maintaining as extended an operational range, in terms of torque and power, as possible to fulfil various vehicle operating conditions.

The purpose of this invention is to meet the needs outlined above in an optimal and inexpensive way.

SUMMARY OF THE INVENTION

The above-mentioned purpose is achieved with an electric traction axle/beam as claimed in the attached claims, which are an integral part of this description.

BRIEF DESCRIPTION OF THE DRAWINGS

For a better understanding of this invention, a preferred embodiment is described below by way of non-limiting example and with reference to the accompanying drawings, wherein:

FIG. 4 is a schematic view of an electric traction axle/beam in accordance with a second embodiment according to the invention;

FIG. 6 is a schematic view of an electric traction axle/beam according to a third embodiment according to the invention;

DETAILED DESCRIPTION OF THE INVENTION

Figure 1:
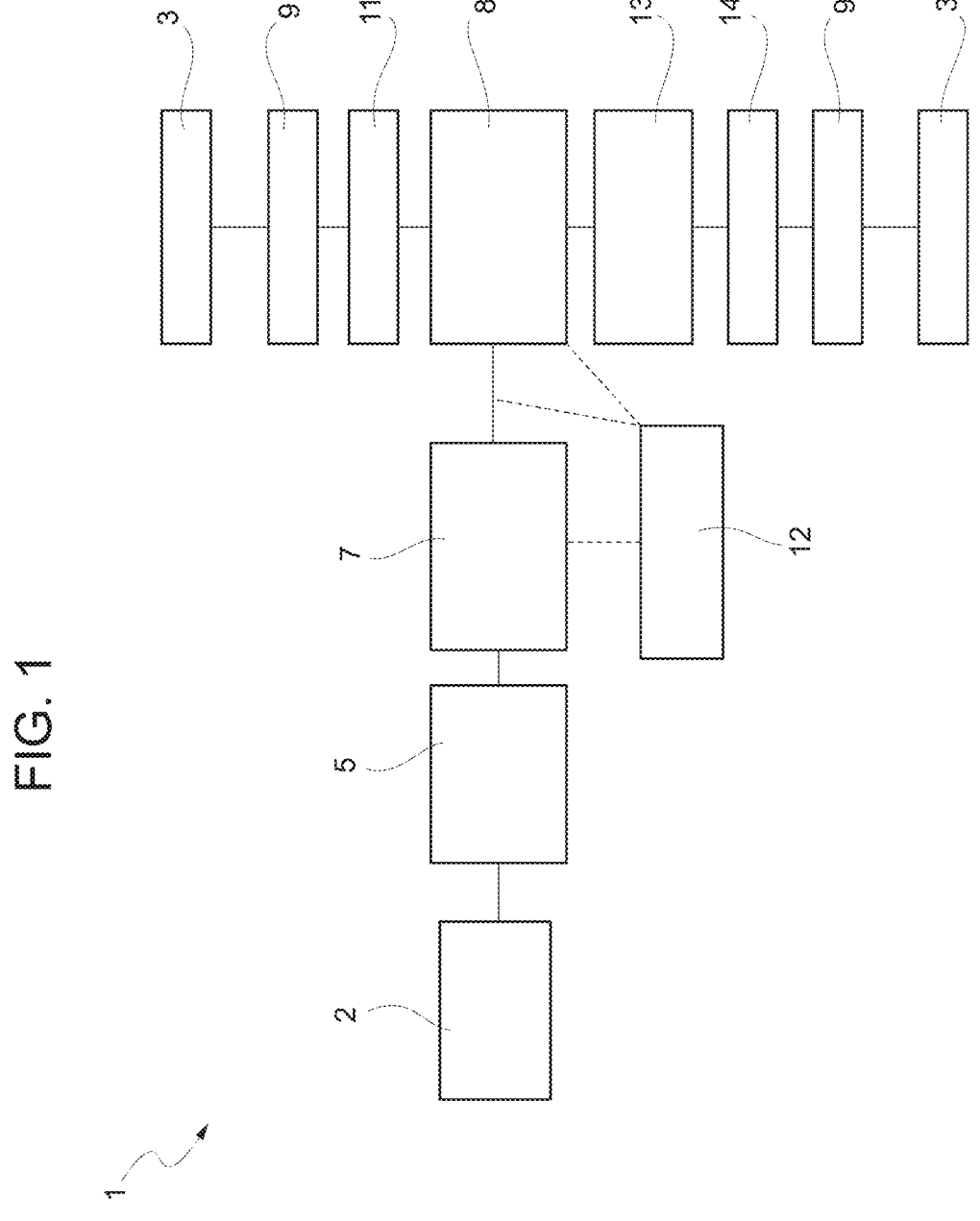
FIG. 1 is a diagram indicating an operational relation between various functional systems of the electric traction axle/beam according to a first embodiment that is not part of the invention but useful for its operation.

For simplicity, the expression axle/beam or e-axle/e-beam will be used below to avoid repetitions, since the invention can be applied to both architectures.

The attached, schematic FIGS. 1, 3, 5, 7, 9, 11, 13) schematically depict a transmission chain for exchanging torque in an electric axle/beam 1, or e-axle/e-beam, between an electric machine 2 and a pair of wheels 3 supported by the drive shafts 4', 4" of the electric axle 1.

The electric machine 2, as known, is electrically connected to a power source, such as a battery pack (not illustrated) of the vehicle and is configured to exchange power with this, in particular receiving it to generate torque for the wheels 3 or introducing it into the electric machine, receiving torque from the wheels 3.

As schematically depicted, the transmission chain of the electric axle 1 comprises, in sequence, a first transfer system 5, a second transfer system 7, and a differential unit 8 between the electric machine 2 and the wheels 3.

Advantageously (FIGS. 3, 5, 7, 9, 11, 13), there may be a speed ratio change system 6 between the first transfer system 5 and the second transfer system 7. The term "transfer system" means a system for changing the torque/speed between input and output, which can have a greater, lesser, or equal ratio to either the output or input. Advantageously, the second transfer system 7 is designed as a reducer.

The differential unit 8 is interposed between the drive shafts 4', 4". Optionally, the latter may be, respectively, connected to the wheels by means of a wheel hub reduction system 9.

Optionally, there may be a differential lock system 11 placed between the differential unit 8 and one of the drive shafts 4', 4" and, as an additional option, there may be a parking brake system 12 configured to operationally cooperate with either the second transfer system 7 or the differential unit 8 to lock the movement of the electric axle 1.

Again, optionally, there may be an oil distribution system 13 operationally interposed between the differential unit 8, one of the drive shafts 4', 4", and the corresponding wheel hub reduction system 9.

Between the wheels 6 and the differential unit 8, there may also, optionally, be a disconnection system 14 creating a connection or opening of one of the two drive shafts making vehicle towing possible by actually disconnecting at least one electric machine 2 and the transmission chain upstream of the differential unit 8.

Figure 2:
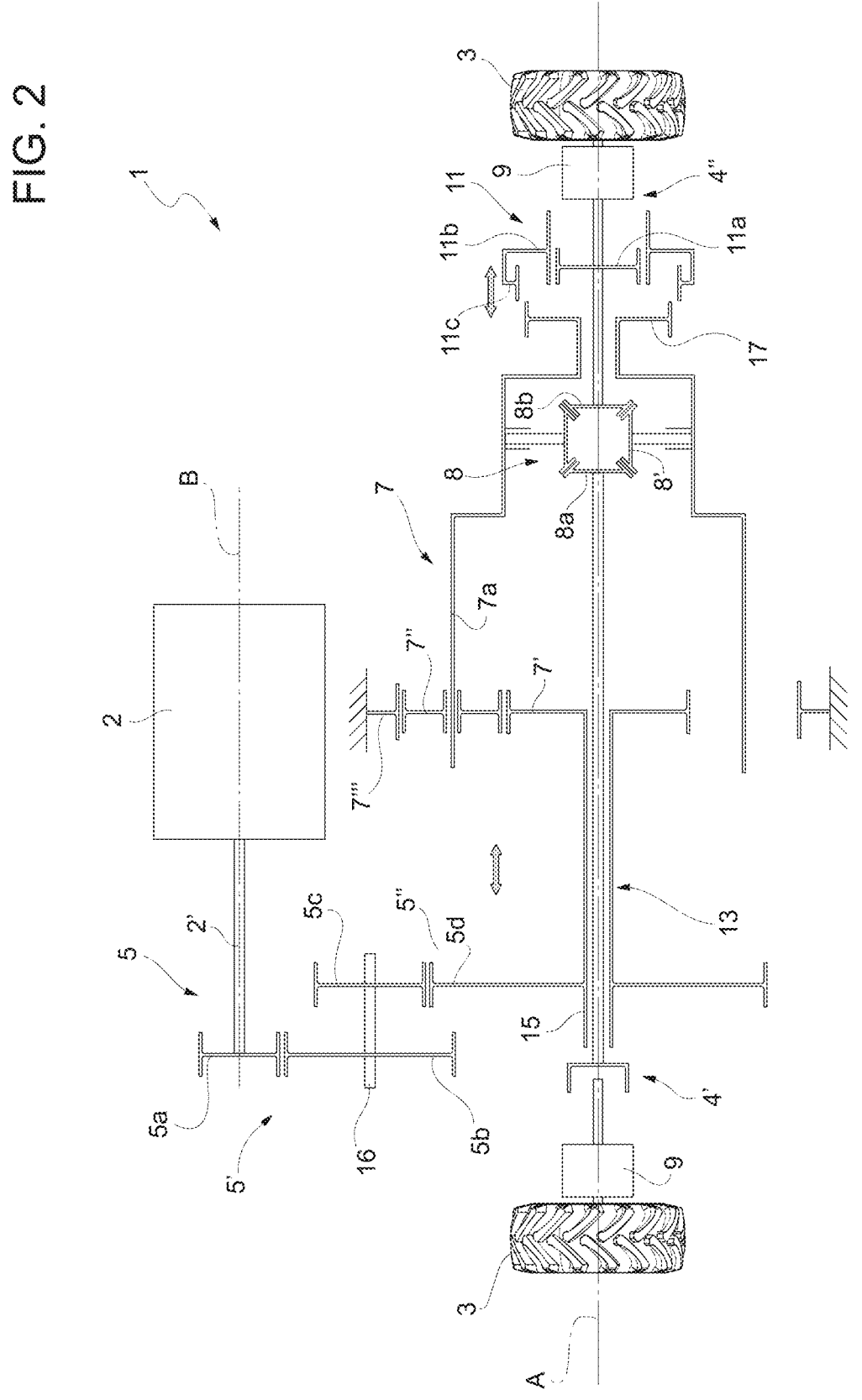
FIG. 2 is a schematic view of an electric traction axle/beam according to the above-mentioned first embodiment.

With reference to FIG. 2, it should be noted that the axis of an operating shaft 2' of the electric machine 2, i.e. a shaft supported by the electric machine 2 rotor, is coaxial to an axis B that is parallel to and spaced apart from a longitudinal axis A of the axle/beam 1, i.e. coaxial to the drive shafts 4', 4".

This configuration, where the axes A, B are separate and parallel will be defined as "off-axis configuration" below for brevity.

Although not included in FIG. 2, the axle 1 comprises a casing designed to house the transmission chain described, part of the drive shafts 4', 4", and to support the electric machine 2, in particular its stator. This casing defines a space designed to house the elements described below of the transmission chain, insulating them from the outside environment.

The operating shaft 2' of the electric machine 2 is operationally connected by means of the first transfer system 5 to an input shaft 15.

Advantageously, the input shaft 15 is freely rotationally supported with respect to one of the two drive shafts 4', 4": for simplicity, in this description, reference will be made to the left drive shaft 4' although it is clear that what is described could be reversed, in a mirror-like way, between the left and right drive shaft.

Advantageously, the first transfer system 5 defines at least one transmission ratio between the input shaft 15 and the operating shaft 2' and is, preferably, produced as a parallel shaft reduction system. Specifically, in the embodiment, this transmission ratio is defined by two speed jumps 5', 5" defined by respective gears.

In particular, the transfer system comprises a first gear 5' defined by a first gear wheel 5a rigidly supported by the operating shaft 2' and a second gear wheel 5b rigidly supported by a support shaft 16 and the second gear 5" comprises a third gear wheel 5c rigidly supported by the support shaft 16 and a fourth gear wheel 5d rigidly supported by an input shaft 15.

Clearly, though not illustrated, additional gear configurations can be applied such as, for example, a configuration wherein the second gear wheel 5c is not included and the first gear wheel 5a directly meshes with the second gear wheel 5b, as, for example, implemented in some embodiments described below.

The second transfer system 7 is advantageously produced as an epicyclic assembly thus comprising a sungear 7', multiple satellites 7", and a crown 7"'.

The sungear 7' is advantageously supported by the left drive shaft 4' and, as known, meshes with multiple satellites 7", which, in turn, mesh with the crown 7"' that is rigidly supported by a portion of the axle/beam 1, such as the casing (not illustrated). The satellites 7" are supported by pins connected to a carrier 7a.

In the embodiment in FIG. 2, the sungear 7' is supported by the input shaft 15.

The differential unit 8 is of the type with conical gears and comprises, as known, multiple satellites 8' driven by the carrier 7a and meshing with a pair of bevel wheels 8a. 8b rigidly supported by the left drive shaft 4' and the right drive shaft 4".

In particular, it should be noted that the left drive shaft 4' comprises a first portion, defining the lubrication system 13, and a second portion operationally connected to the gear 8a. In this case, therefore, the bevel gear 8a is supported by the portion defining the lubrication system 13.

The differential lock system 11 is, as known, configured to lock the action of the differential unit 8, firmly connecting the two drive shafts 4', 4" by connecting one of the two drive shafts 4', 4" with the differential unit container.

In the embodiment illustrated, the differential lock system 11 essentially comprises a sleeve 11b supported so as to slide along the axis A from the hub 11a and, therefore, from the right drive shaft 4" by means of a connection, such as a grooved one, which can be moved thanks to the action of the actuator means, not illustrated.

The sleeve 11b also defines toothing 11c configured to selectively cooperate as a function of its movement along the axis A with toothing formed on one portion 17 supported, integrally, with the carrier 7a.

The wheel hub reduction system 9, if included, may be produced according to necessity and in different ways and, therefore, is not further described for brevity.

Similarly, the parking lock system 12 can be produced in different forms and on different operating portions of the axle/beam 1 and, therefore, is not further described for brevity.

The operation of the embodiment of the electric traction axle/beam according to the embodiment described above is the following.

In a first operating condition, wherein the electric machine 2 acts as an electric motor, it provides torque to the first transfer system 5 that transfers the torque, increasing its value and, therefore, reducing the rotation speed, to the input shaft 15. The torque from the input shaft 15 passes from the sungear 7' through the satellites 7" to the carrier 7a and, from there, to the differential unit 8. From the differential unit 8, as known, it is divided between the drive shafts 4', 4" and, thus, by means of the wheel hub reduction systems 9, if included, to the wheels 3, or to them directly.

The differential unit may be locked by means of the differential lock system 11.

In a second operating configuration, wherein the electric machine 2 acts as an electric generator, the torque is provided by the wheels 3 driven by the motion of the vehicle and follows the same transmission chains previously described, in the opposite direction, up to the electric machine 2 that, therefore, generates electricity with the torque received as input.

Figure 3:
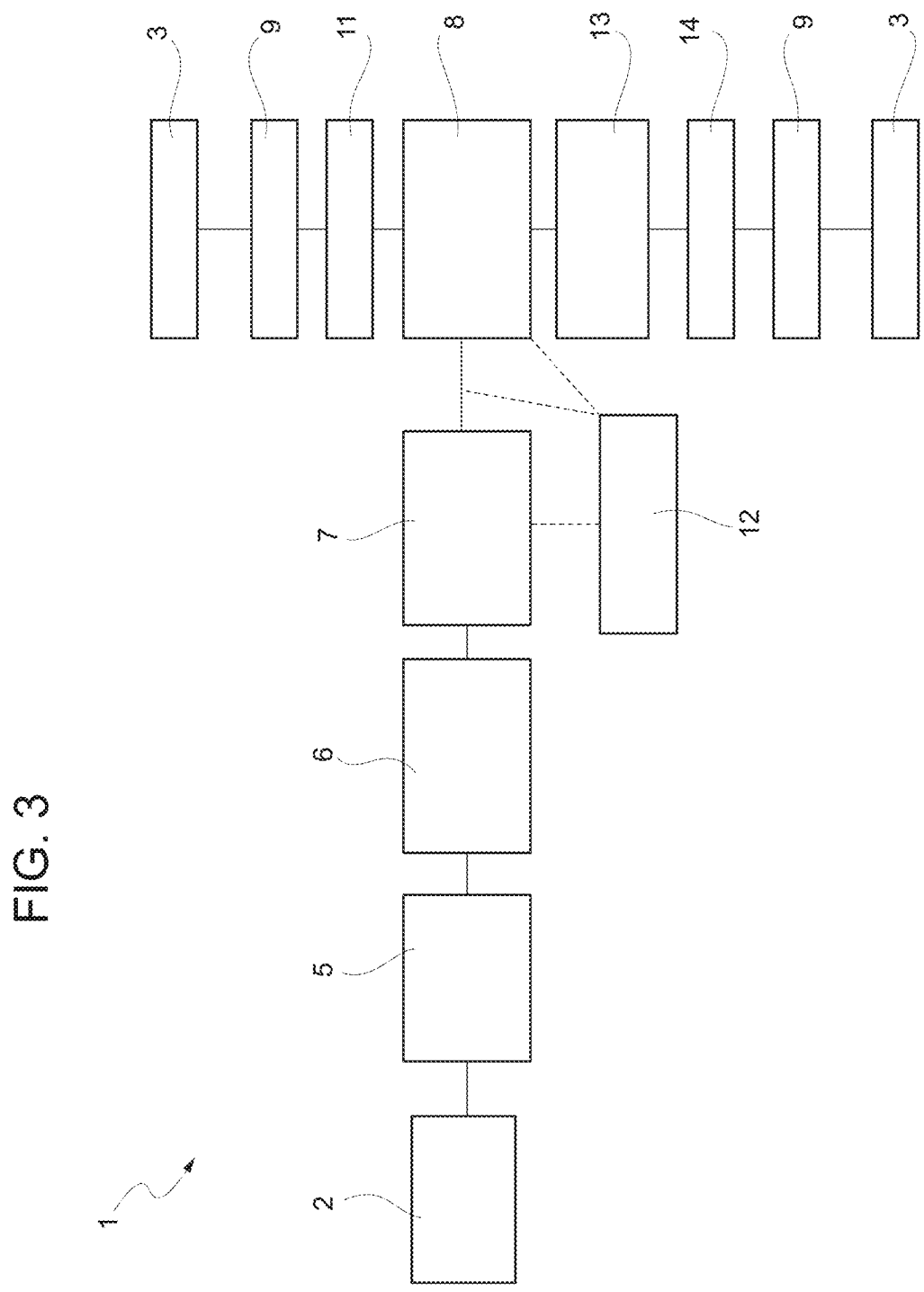
FIG. 3 is a diagram indicating an operational relation between various functional systems of the electric traction axle/beam according to a second embodiment according to the invention.
Figure 4:
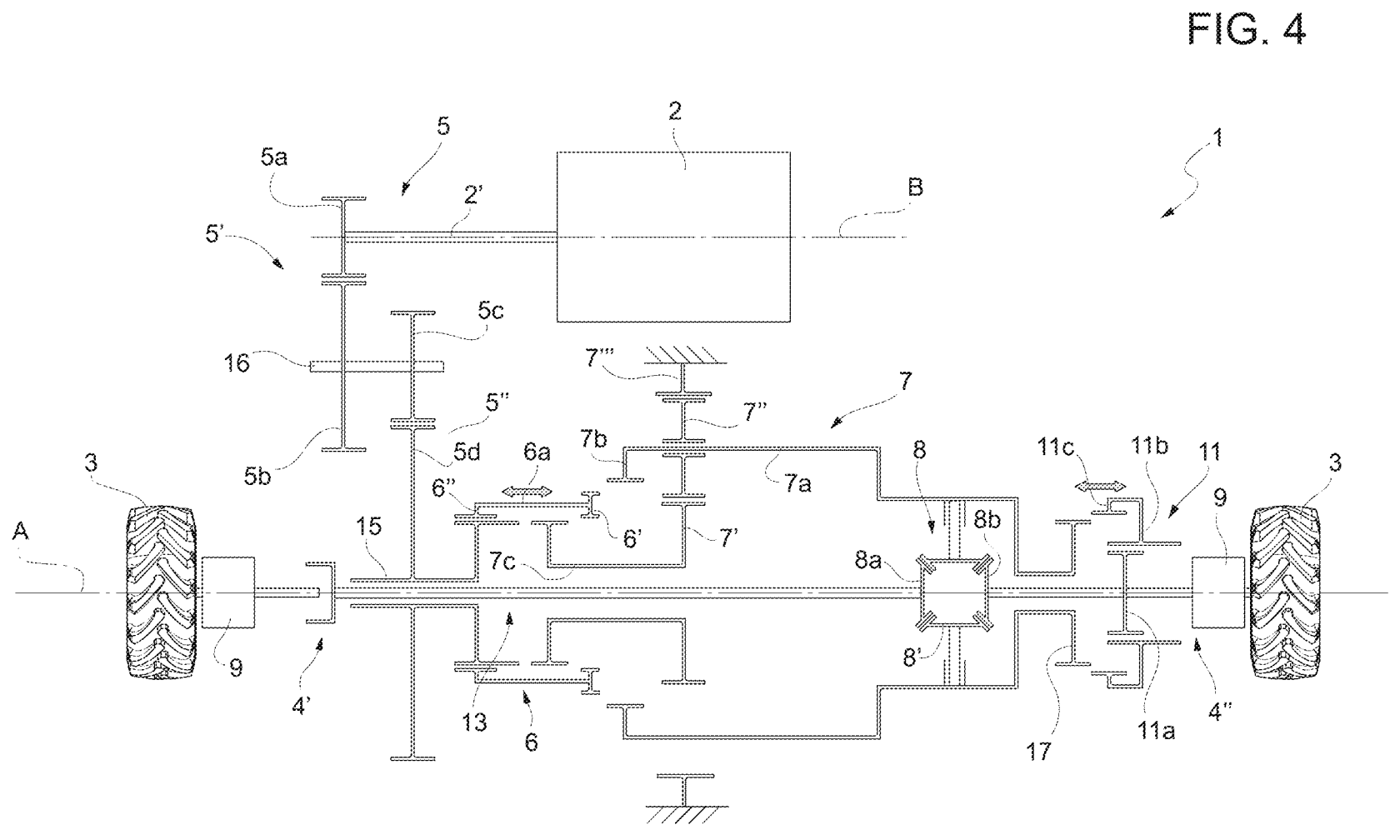

In the second embodiment in FIGS. 3 and 4, with respect to the first embodiment, there is a speed selector gearbox 6 between the first and second transfer system 5, 7.

In this embodiment, illustrated in FIG. 4, the input shaft 15 can be connected to either the carrier 7a or the sungear 7' thanks to the speed ratio change system 6.

In the embodiment described, the speed selector gearbox 6 essentially comprises a sleeve 6a defining a first and second toothing 6', 6".

Advantageously, the second toothing 6" is configured to cooperate sliding, thus defining a grooved coupling with the input shaft 15 along the axis A. This movement is adjusted using actuator devices, not illustrated nor described for brevity.

As a function of the movement along the axis A first described, the first toothing 6' can cooperate, respectively, with a toothing 7b rigidly supported by the carrier 7a (reduction ratio equal to one) or with toothing 7c rigidly supported by the sungear 7' (maximum reduction ratio) or, alternatively, with neither (idle configuration).

The operation of the embodiment of the electric traction axle/beam according to the embodiment of the invention described above is the following.

In a first operating condition, wherein the electric machine 2 acts as an electric motor, it provides torque to the first transfer system 5 that transfers the torque, increasing its value and, therefore, reducing the rotation speed, to the input shaft 15. Depending on the position of the sleeve 6a, the torque is directly transferred to the carrier 7a and, thus, to the differential unit 8 or additionally altered in value by means of transfer between the sungear 7' and satellites 7". The torque from the input shaft passes from the sungear 7' through the satellites 7" to the carrier and, from there, to the differential unit 8. From the differential unit 8, as known, it is divided between the drive shafts 4', 4" and, thus, by means of the wheel hub reduction systems 9, if included, to the wheels 3, or to them directly.

The differential unit may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, up to the electric machine 2 that, therefore, generates electricity with the torque received as input.

Figure 5:
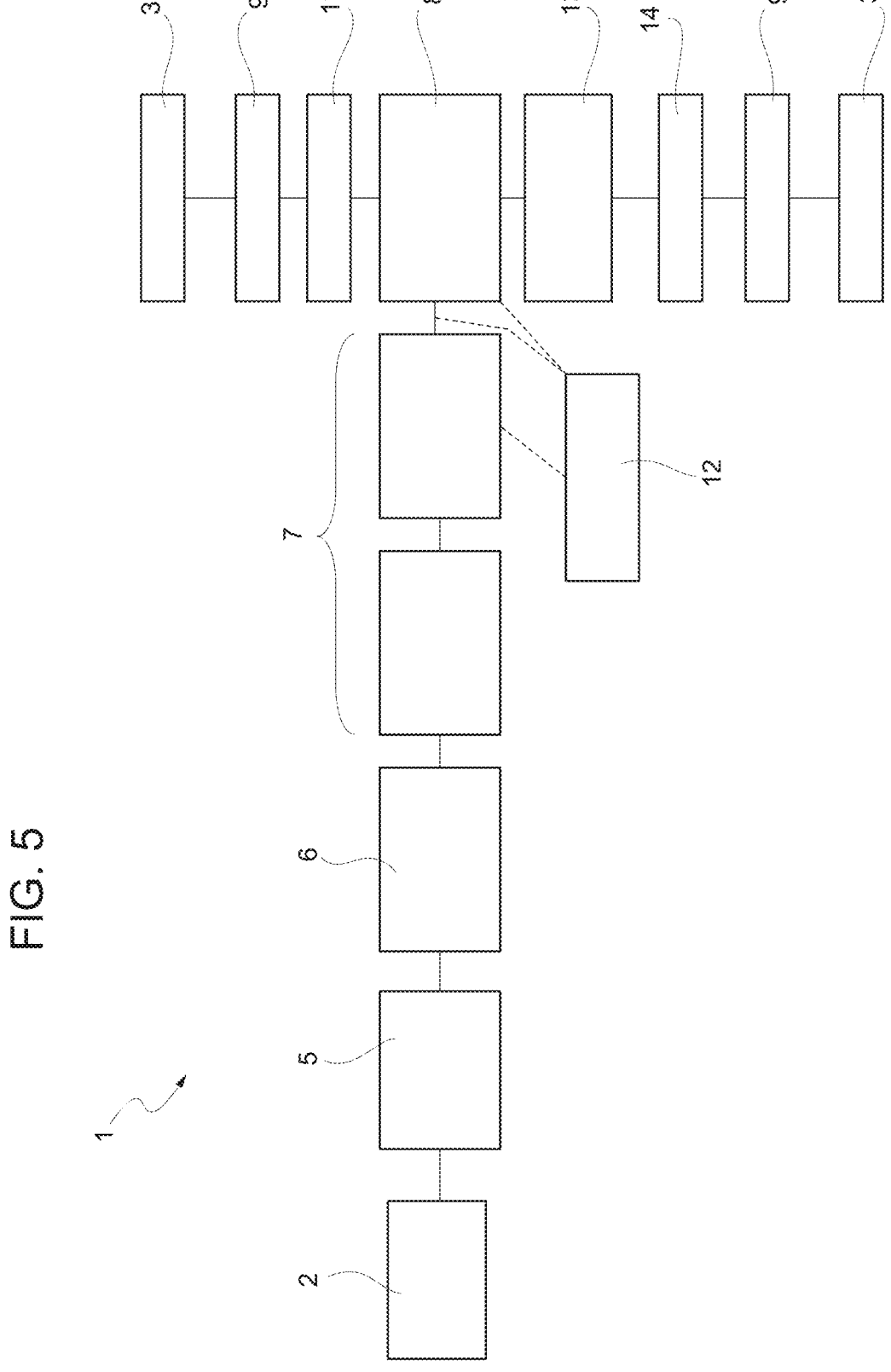
FIG. 5 is a diagram indicating an operational relation between various functional systems of the electric traction axle/beam according to a third embodiment according to the invention.
Figure 6:
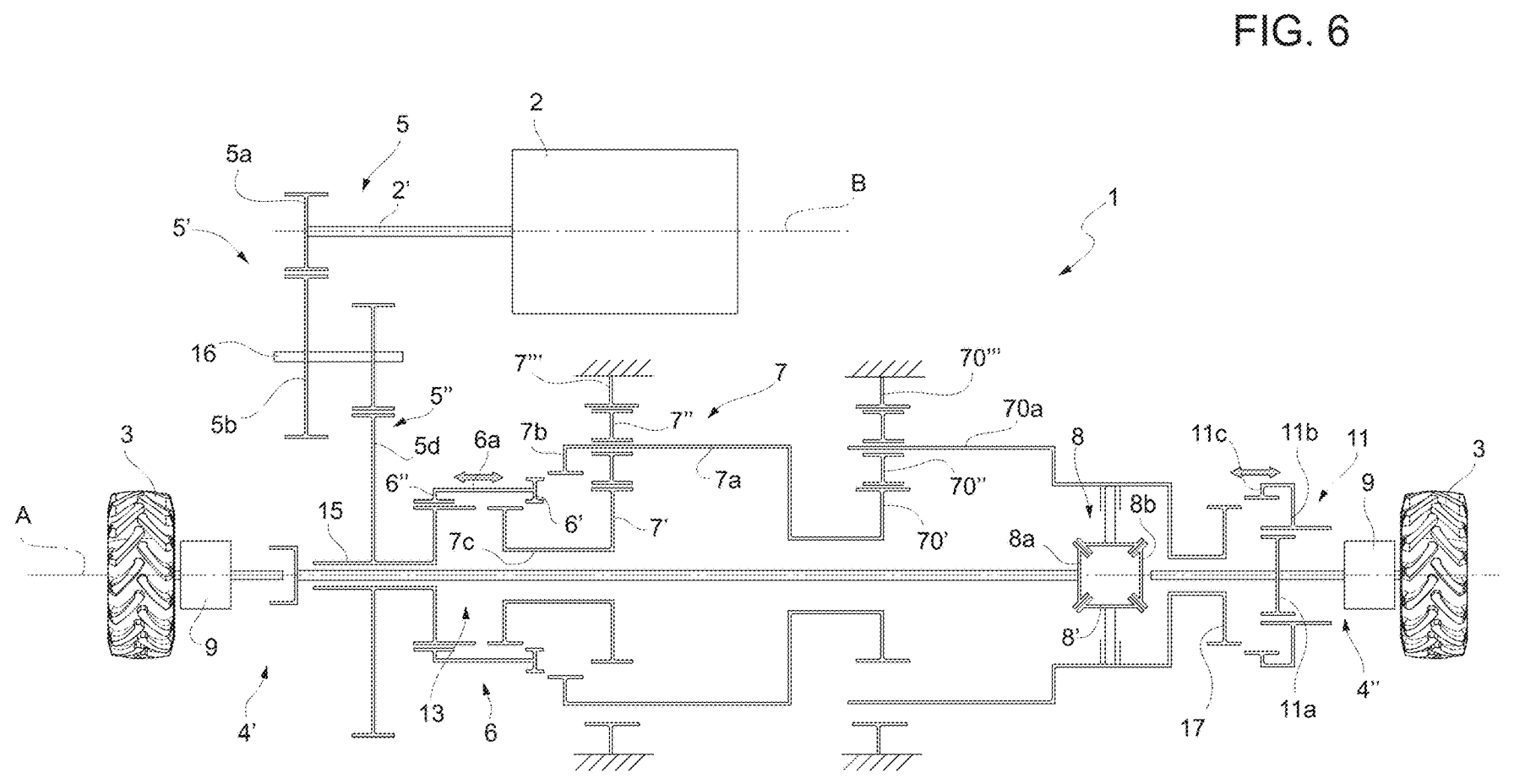

In the third embodiment, schematically depicted in FIGS. 5 and 6, with respect to the second embodiment, the second reduction system 7 comprises a pair of epicyclic gear devices operationally in sequence.

In particular, the second epicyclic gear device comprises a second sungear 70', a second plurality of satellites 70", a second crown 70''' connected to the casing of the beam/axle.

The second sungear 70' is advantageously rigidly connected with respect to torque to the carrier 7a of the first epicyclic gear device, and meshes with the second plurality of satellites 70", which, in turn, mesh with the second crown 70''' that is rigidly supported by the same rigid portion of the axle 1.

The second plurality of satellites 70" is connected to a carrier 70a which is operationally connected to the differential unit 8 and to the differential lock system 11, if included, similarly to what is described for the first embodiment and, thus, not repeated for brevity.

The operation of the embodiment of the electric traction axle according to the embodiment of the invention described above is the following.

In a first operating condition, wherein the electric machine 2 acts as an electric motor, it provides torque to the first transfer system 5 that transfers the torque, increasing its value and, therefore, reducing the rotation speed, to the input shaft 15. Depending on the position of the sleeve 6a, the torque is directly transferred to the carrier 7a and, thus, to the second sungear 70' and to the satellites 70" towards the differential unit 8 or, additionally, altered in value by means of transfer between the first sungear 7' and the first satellites 7". From the differential unit 8, as known, it is divided between the drive shafts 4', 4" and, thus, by means of the wheel hub reduction systems 9 (if included) to the wheels 3. The differential unit may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, up to the electric machine 2 that, therefore, generates electricity with the torque received as input.

Figure 7:
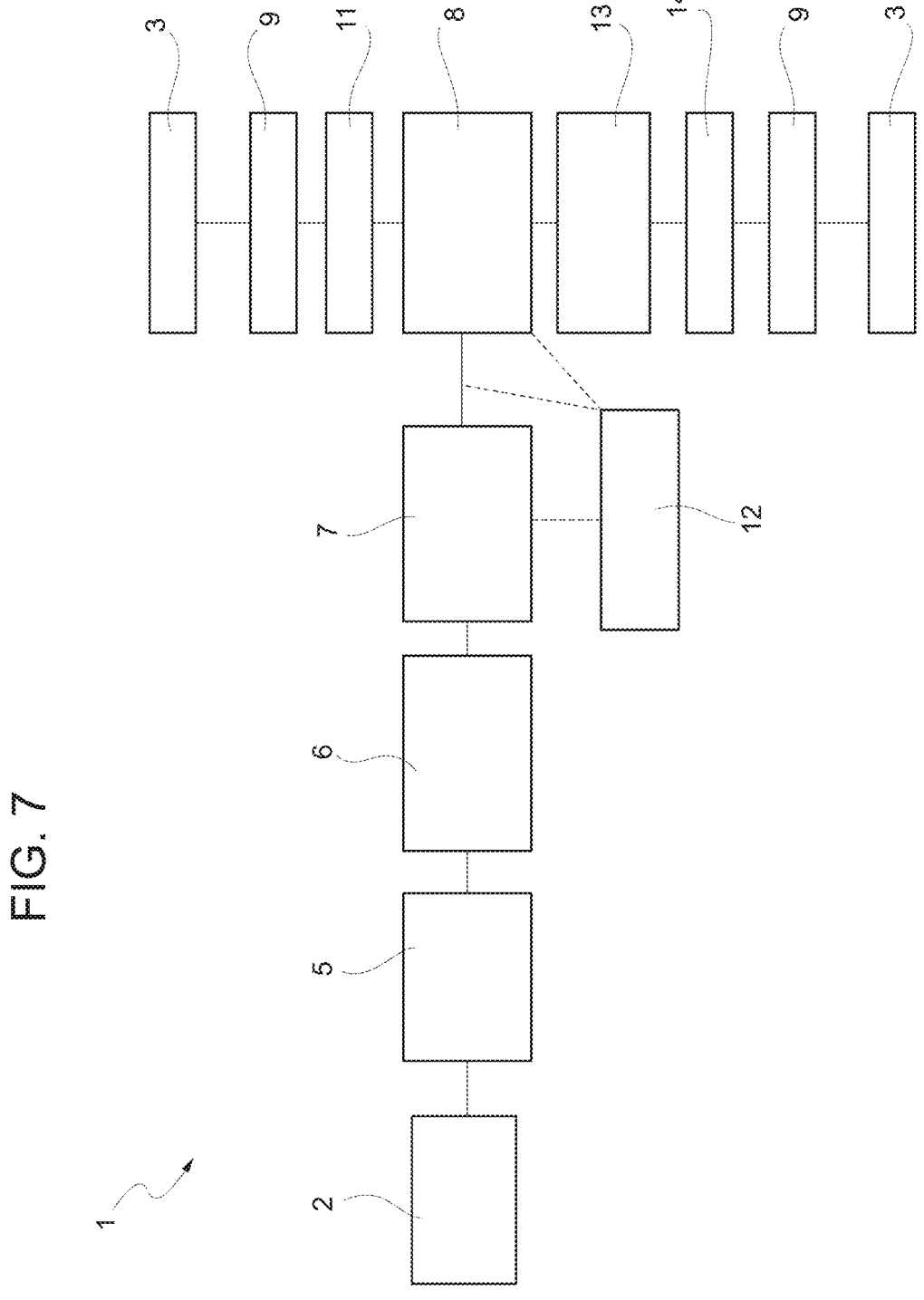
FIG. 7 is a diagram indicating an operational relation between various functional systems of the electric traction axle/beam according to a fourth embodiment according to the invention.
Figure 8:
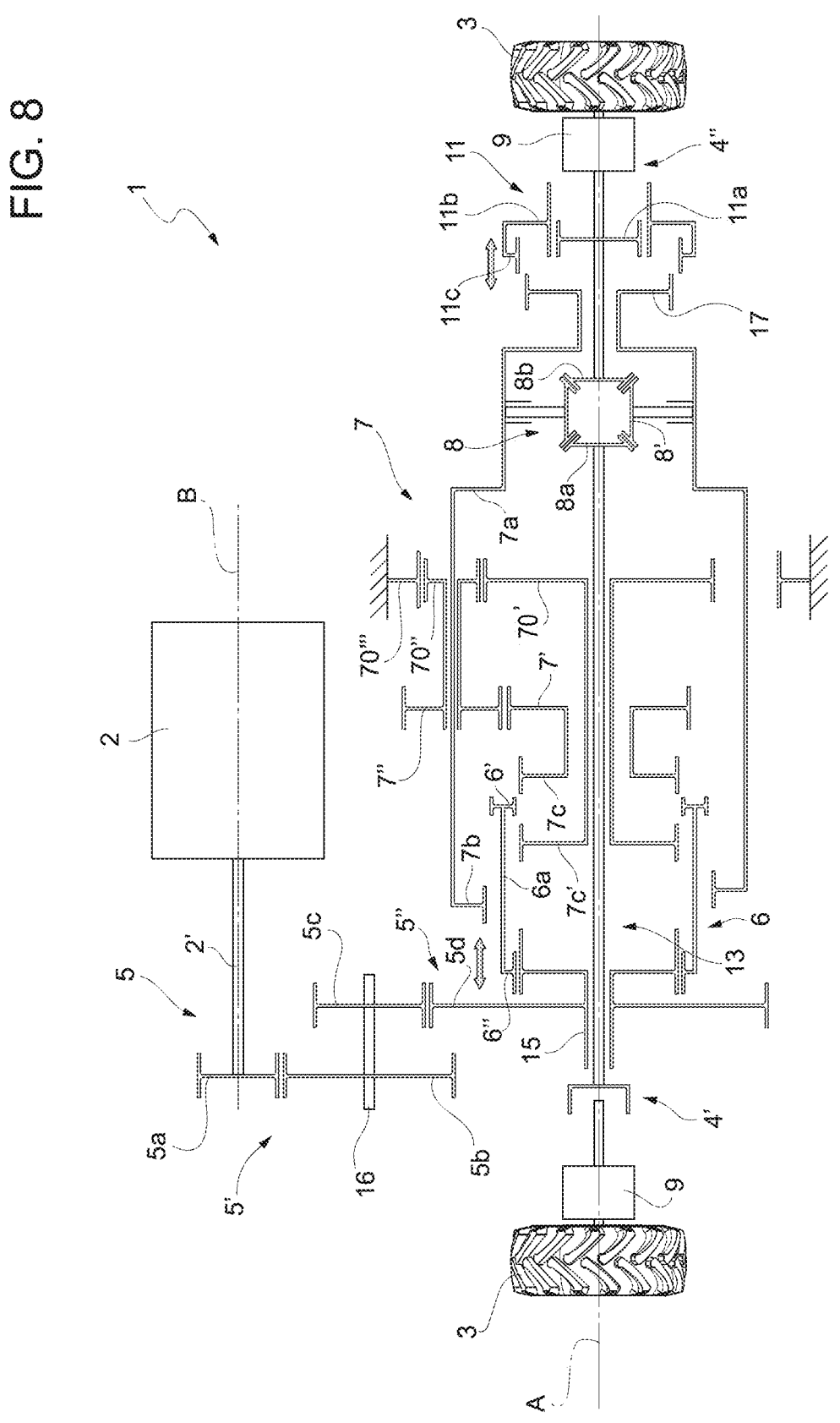
FIG. 8 is a schematic view of an electric traction axle/beam according to a fourth embodiment according to the invention.

In the fourth embodiment, shown in FIGS. 7 and 8, there is a compound epicyclic gear device produced in a different way to the third embodiment described above.

A particular epicyclic system in which the satellite gears have two bands of toothing rigidly connected together with respect to torque is called "compound".

In particular the compound epicyclic gear device in this embodiment comprises a first sungear 7' freely rotationally supported on a second sungear 70'. These sungears can be connected by means of the speed selector gearbox 6 that makes it possible to connect the input shaft 15 to a first portion 7c integral with the first sungear 7' or a second portion 7c' integral with the second sungear 70' or to the carrier 7a by means of the portion 7b connected to the carrier 7a.

The first sungear 7' meshes with a first plurality of satellites 7" and the second sungear 70' meshes with a second plurality of satellites 70". In this embodiment, the first plurality of satellites 7''' is rigidly connected to the second plurality of satellites 70", which meshes with a crown 70'" rigidly supported with respect to the beam/axle 1.

Both the pluralities of satellites 7", 70" are supported by the same carrier 7a connected to the differential unit 8 as in the previous embodiments.

Specifically, the speed selector gearbox 6 can be configured in this embodiment to assume a third position wherein it can connect the input shaft 15 to toothing 7b that is integral with the carrier 7a.

The operation of the embodiment of the electric traction axle according to the embodiment of the invention described above is the following.

In a first operating condition, wherein the electric machine 2 acts as an electric motor, it provides torque to the first transfer system 5 that transfers the torque, increasing its value and, therefore, reducing the rotation speed, to the input shaft 15. Depending on the position of the sleeve 6a, the torque is directly transferred to the carrier 7a or to the first sungear 7' or to the second sungear 70' so as to drag, depending on the transmission chain, the differential unit with three different and distinct transmission ratios. From the differential unit 8, as known, it is divided between the drive shafts 4', 4" and, thus, by means of the wheel hub reduction systems 9 (if included) to the wheels 3. The differential unit may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, up to the electric machine 2 that, therefore, generates electricity with the torque received as input.

Figure 9:
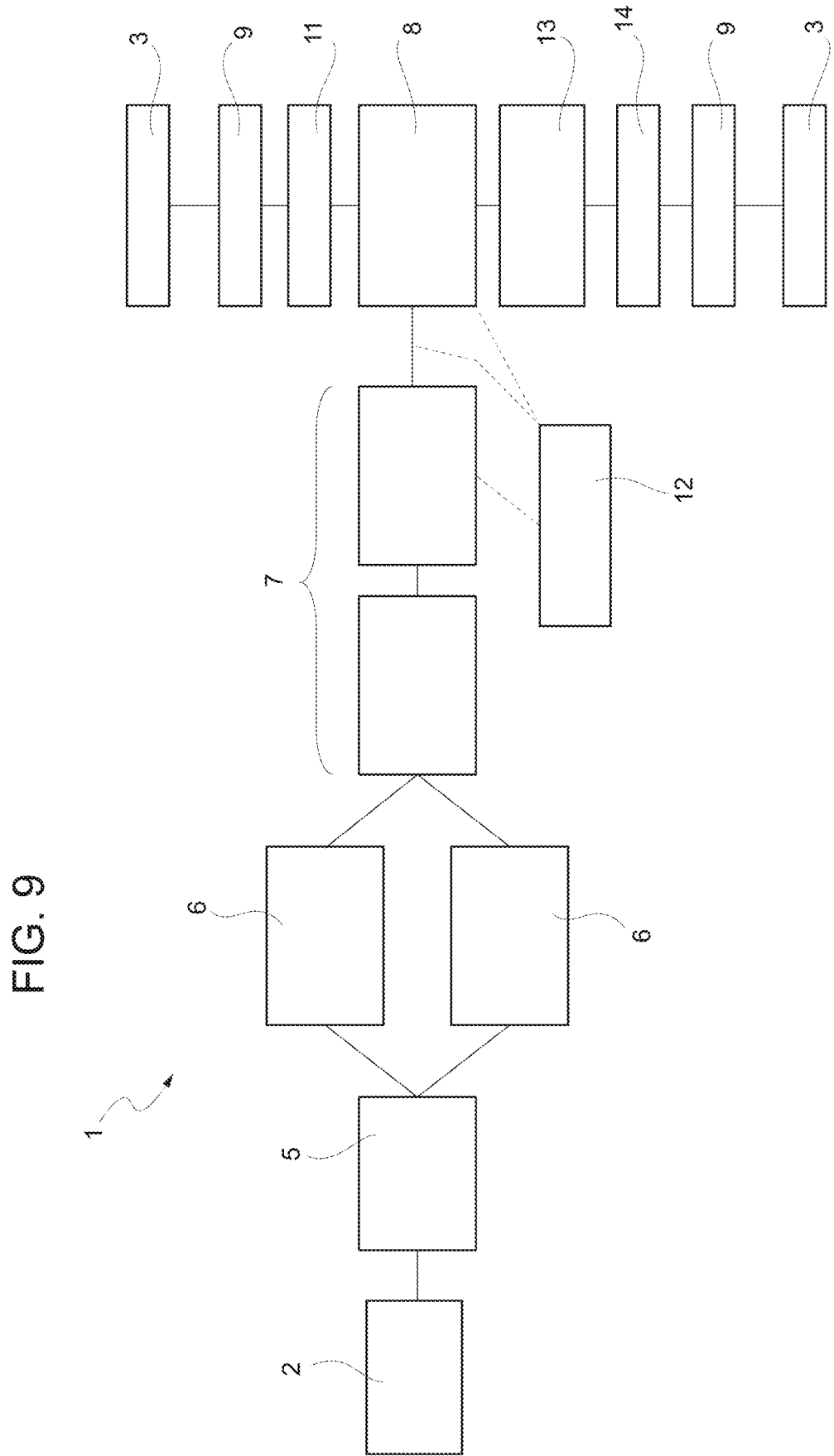
FIG. 9 is a diagram indicating an operational relation between various functional systems of the electric traction axle/beam according to a fifth embodiment according to the invention.

In the fifth embodiment schematically depicted in FIGS. 9 and 10, with respect to the fourth embodiment of the axle/beam 1, the speed ratio change system 6 is produced differently with respect to the embodiment previously illustrated and is configured to provide additional configurations as described below.

Specifically, in addition to the first sleeve 6a previously described and configured to distribute the torque to one (or none, in idle) of either the first sungear 7' or the carrier 7a, the speed ratio change system 6 also comprises a second sleeve 6b supported so it is mobile along the axis A from the input shaft 15 and selectively cooperating by means of toothing 6c with an additional input shaft 15'.

The additional input shaft 15' is freely rotationally supported between the drive shaft 4' and the input shaft 15 and integrally supports the second sungear 7a' configured to mesh with a plurality of satellites 7a" supported by the same carrier 7a and rigidly connected to the first plurality of satellites 7" which mesh, alone, with the first crown 7".

In particular, in the embodiment described, the first and second sleeve 6a, 6b are placed on the opposite side of the wheel supported by the input shaft 15; it is, in any case, clear that they could, advantageously, be placed on the same side as the latter so as to further reduce the dimensions of the axle 1.

The operation of the embodiment of the electric traction axle/beam according to the embodiment of the invention described above is the following.

In a first operating condition, wherein the electric machine 2 acts as an electric motor, it provides torque to the first transfer system 5 that transfers the torque, increasing its value and, therefore, reducing the rotation speed, to the input shaft 15. Depending on the position of the sleeves 6a or 6b

(which alternatively engage one of the two sungears 7' or 7a', or the carrier 7a), the torque is directly transferred to the carrier 7a and, thus, to the third sungear 70' and to the satellites 70" towards the differential unit 8 or, additionally, altered in value by means of transfer between the first sungear 7' and the first satellites 7" or, again, through the second sungear 7a' and second satellites 7a". From the differential unit 8, as known, it is divided between the drive shafts 4', 4" and, thus, by means of the wheel hub reduction systems 9 (if included) to the wheels 3. The differential unit may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, to the electric machine 2 that, therefore, generates power.

Figure 11:
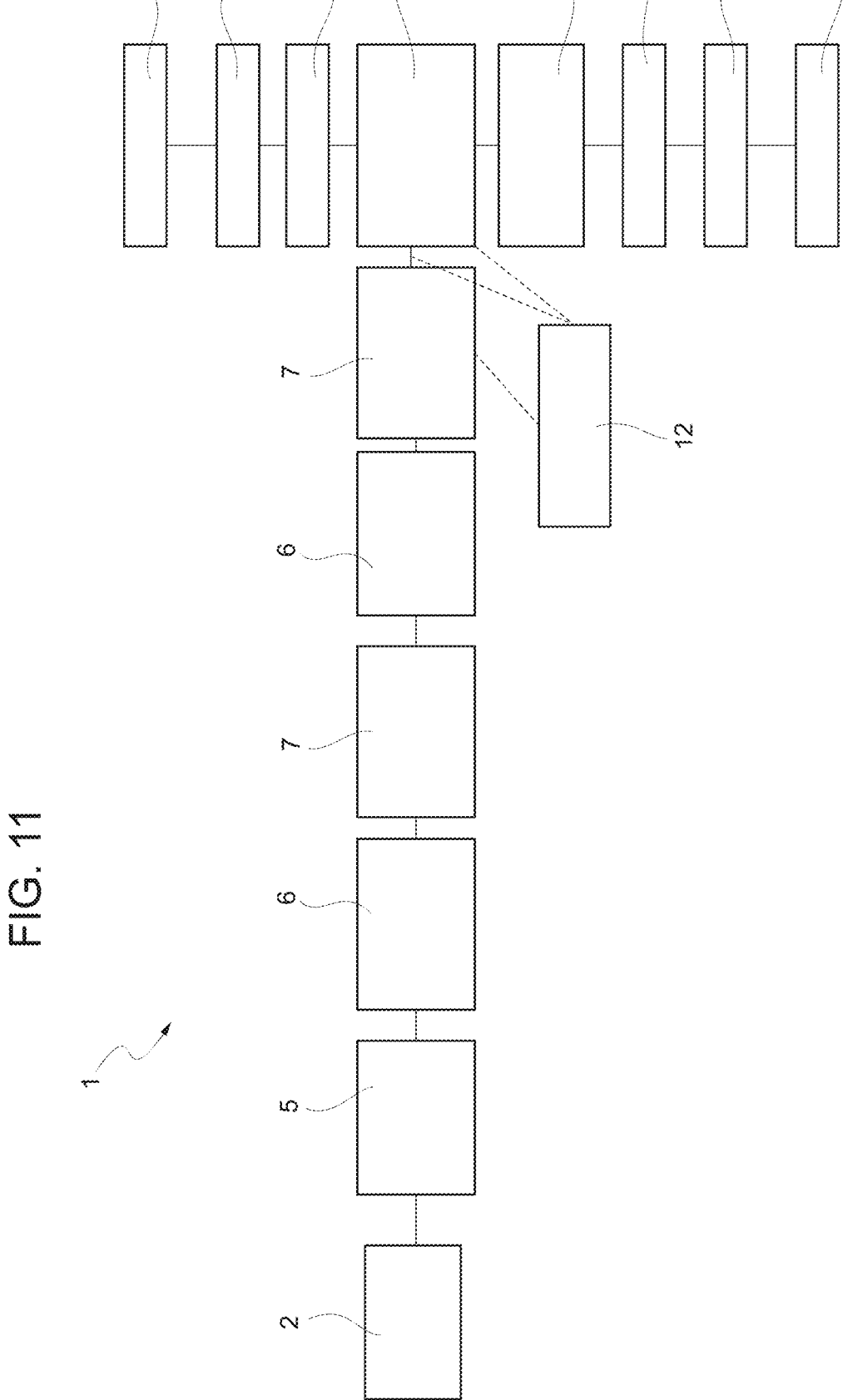
FIG. 11 is a diagram indicating an operational relation between various functional systems of the electric traction axle/beam according to a fifth embodiment according to the invention.
Figure 12:
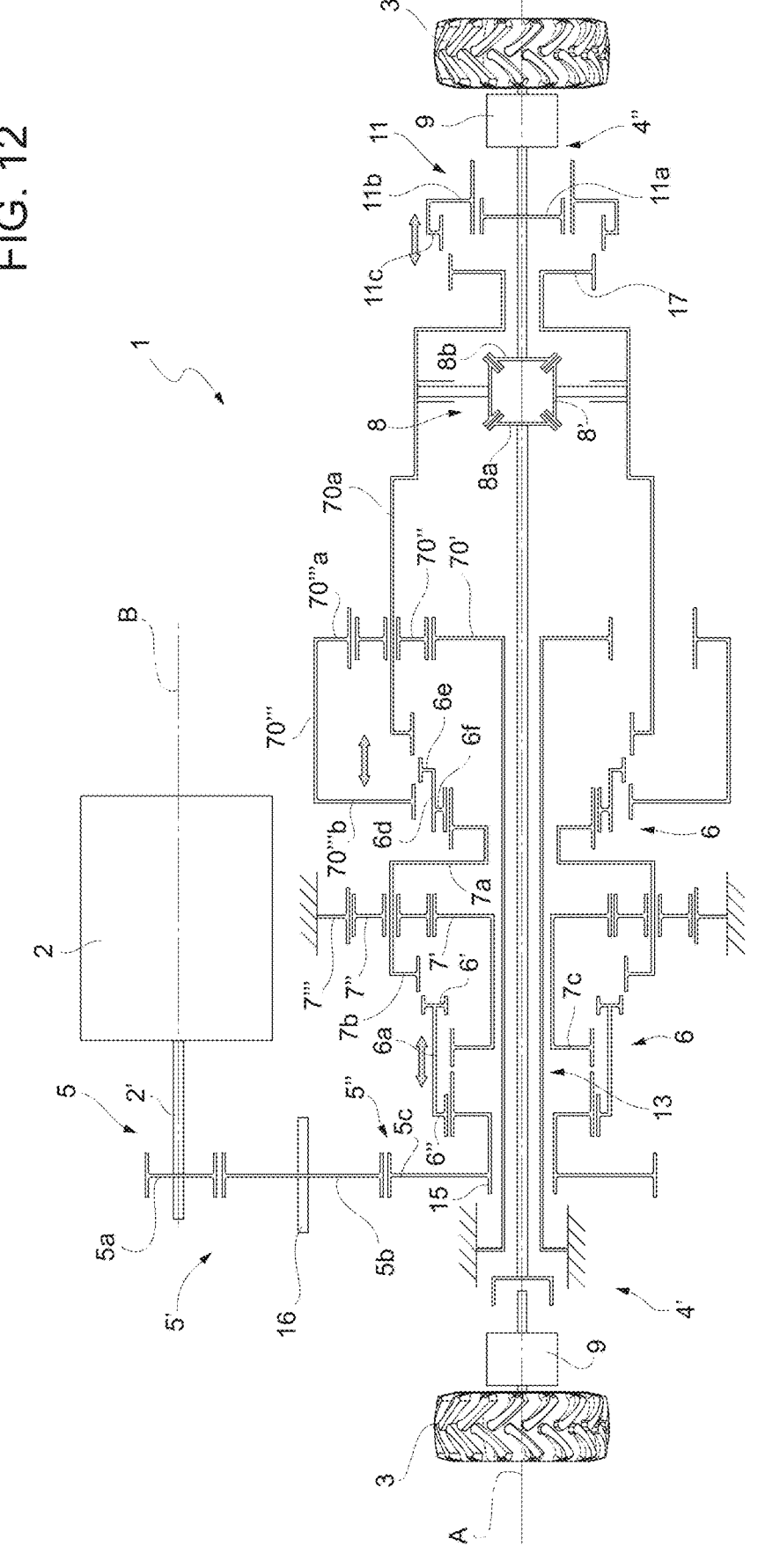
FIG. 12 is a schematic view of an electric traction axle/beam according to a fifth embodiment according to the invention.

In the sixth embodiment schematically depicted in FIGS. 11 and 12, with respect to the second embodiment of the axle/beam 1, the speed ratio change system 6 is produced differently with respect to the embodiment previously illustrated and is configured to provide additional configurations as described below.

Specifically, in addition to the first sleeve 6a previously described and configured to distribute the torque to one (or none, in idle) of either the first sungear 7' or the first carrier 7a, the speed ratio change system 6 also comprises a second sleeve 6d supported so it is mobile along the axis A between the first and second carrier 7a, 70a of the two epicyclic reducer assemblies placed in sequence.

Additionally, with respect to the embodiment described, the second sungear 70' is rigidly fixed to a fixed portion of the casing of the axle 1, meshes with the second satellites 70" and with the crown 70'" (which can rotate) that comprises a first portion 70a'" meshing with the satellites and a second portion 70b'" connected to the crown 70'" selectively meshing with the second sleeve 6d as described below.

This second sleeve 6d is configured to be moved along the axis A and defines a first and second toothing 6f, 6e. The first toothing 6f creates a grooved coupling with the first carrier 7a while the second toothing 6e can mesh directly with the second carrier 70a or with the second portion 70b'" of the second crown 70'".

In a first operating condition, wherein the electric machine 2 acts as an electric motor, it provides torque to the first transfer system 5 that transfers the torque, increasing its value and, therefore, reducing the rotation speed, to the input shaft 15. Depending on the position of the sleeves 6a or 6d, the torque is channeled differently between the elements of the coaxial epicyclic reducer assemblies creating up to 4 different types of reduction ratios. From the differential unit 8, as known, it is divided between the drive shafts 4', 4" and, thus, by means of the wheel hub reduction systems 9 (if included) to the wheels 3. The differential unit may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, to the electric machine 2 that, therefore, generates power.

Figure 10:
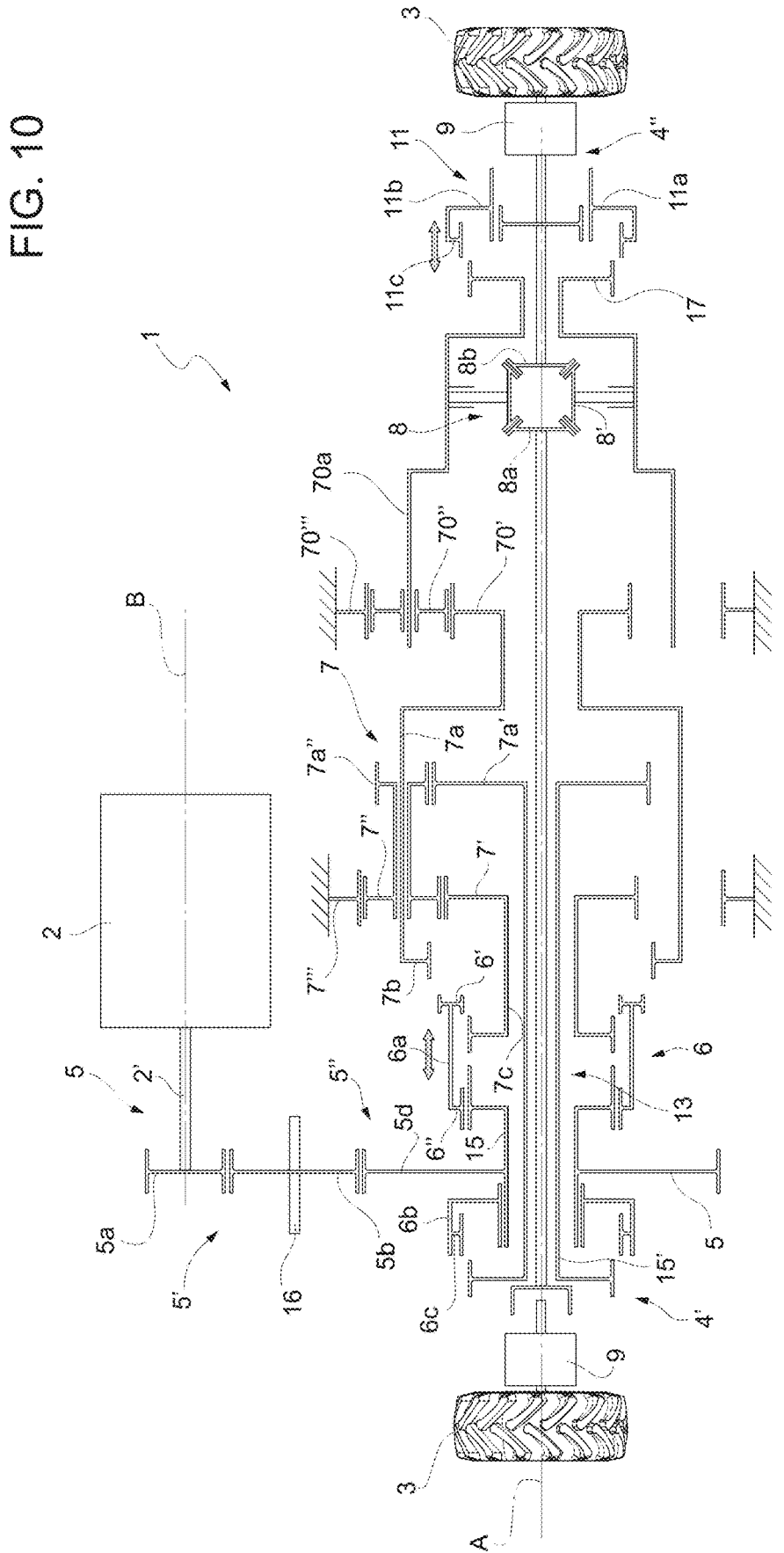
FIG. 10 is a schematic view of an electric traction axle/beam according to a fifth embodiment according to the invention.
Figure 13:
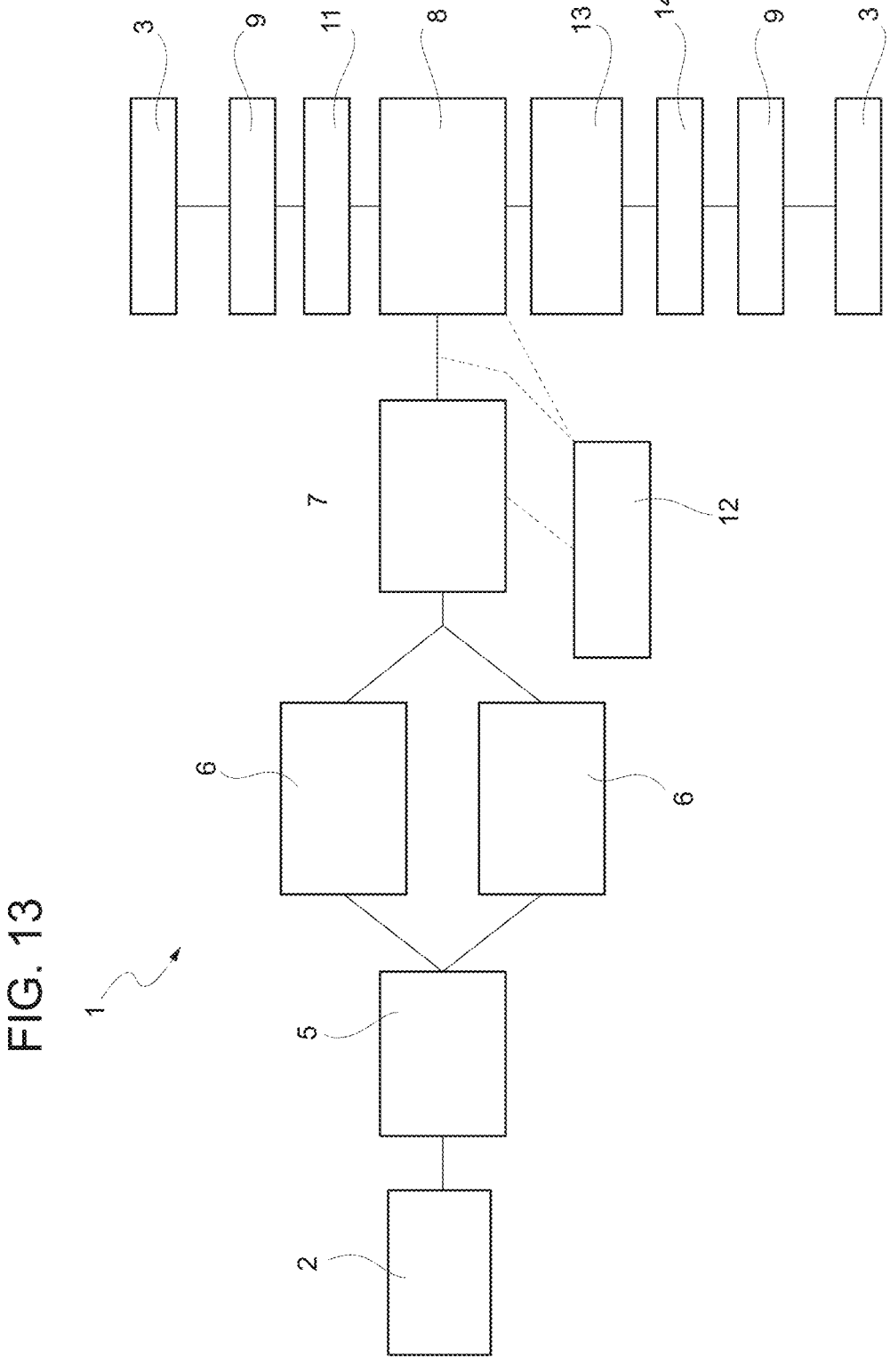
FIG. 13 is a diagram indicating an operational relation between various functional systems of the electric traction axle/beam according to a sixth embodiment according to the invention.
Figure 14:
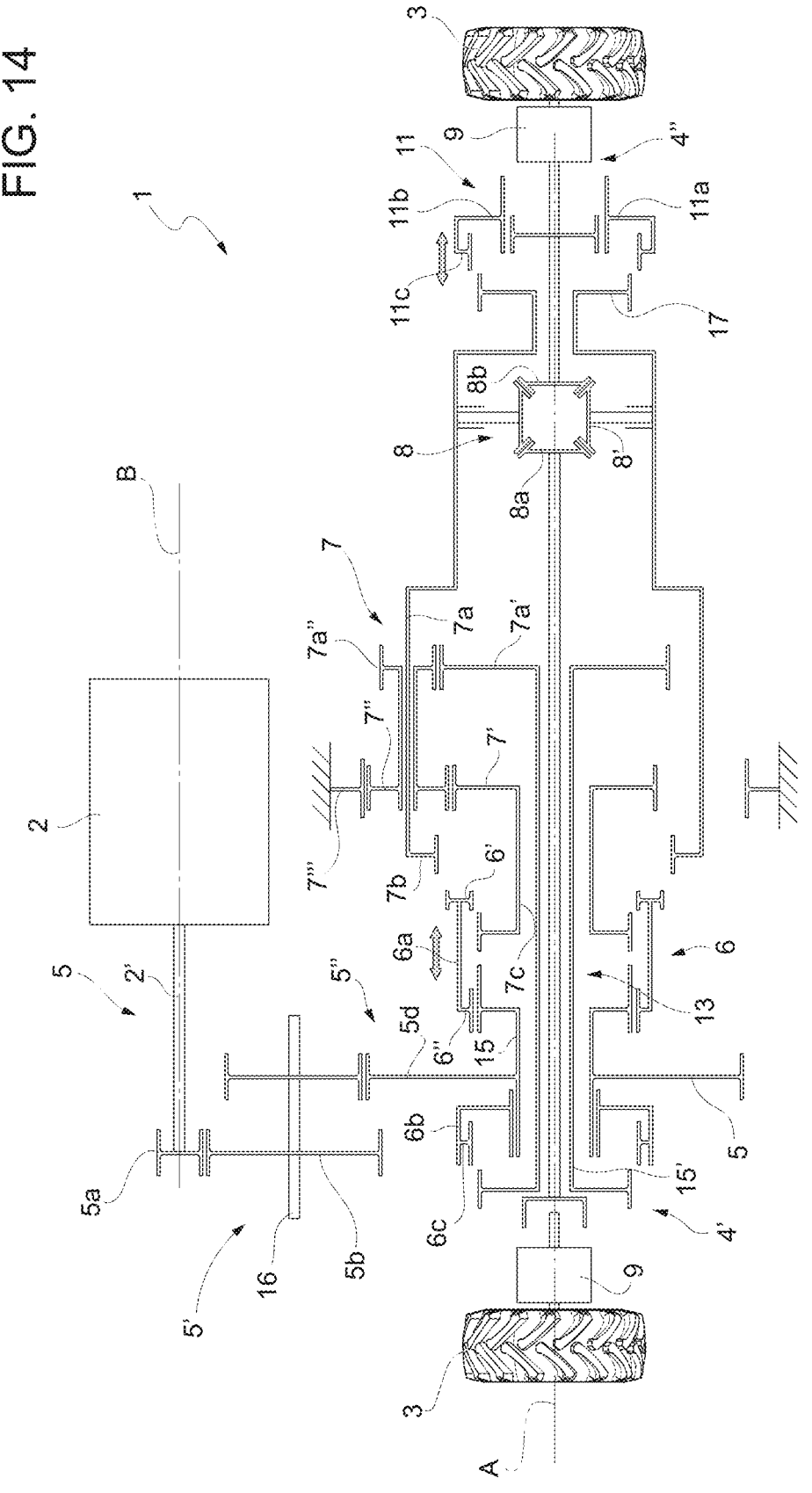
FIG. 14 is a schematic view of an electric traction axle/beam according to a sixth embodiment according to the invention.

In the sixth embodiment schematically depicted in FIGS. 13 and 14, a combination between the embodiments in FIG. 10 and FIG. 4 is produced.

Specifically, the speed ratio change system 6 comprises a first and second sleeve 6a, 6b as described in the embodiment in FIG. 10 interposed between the input shaft 15 and the additional input shaft 15'. The additional details are not included for brevity, since the structure is similar.

With respect to FIG. 10, the carrier 7a is directly connected to the differential unit 8 without interposing a second, additional reduction stage, for example as represented in FIG. 4.

Additionally, the first transfer system 5 has parallel shafts in the configuration represented in FIGS. 2, 4, 6, and 8, but is operationally similar.

The operation of the embodiment of the electric traction axle/beam according to the embodiment of the invention described above is the following.

In a first operating condition, wherein the electric machine 2 acts as an electric motor, it provides torque to the first transfer system 5 that transfers the torque, increasing its value and, therefore, reducing the rotation speed, to the input shaft 15. Depending on the position of the sleeves 6a or 6b (which alternatively engage one of the two sungears 7' or 7a', or the carrier 7a), the torque is directly transferred to the carrier 7a, to the differential unit 8, or, additionally, altered in value by means of transfer between the first sungear 7' and the first satellites 7" or, again, through the second sungear 7a' and second satellites 7a". From the differential unit 8, as known, it is divided between the drive shafts 4', 4" and, thus, by means of the wheel hub reduction systems 9 (if included) to the wheels 3. The differential unit may be locked by means of the differential lock system 11.

In a second operating configuration, wherein the electric machine 2 acts as an electric generator, the torque is provided by the wheels 3 driven by the motion of the vehicle and follows the same transmission chain previously described, in the opposite direction, to the electric machine 2 that, therefore, generates power.

From the above, the advantages of an electric traction axle according to the invention are clear.

Thanks to the axle 1 proposed, it is possible to provide an e-axle/e-beam with reduced longitudinal dimensions while also maintaining a high level of torque/power that can be delivered by the electrified transmission.

Specifically, thanks to the reduction systems proposed, it is possible to provide a high transmission ratio between the electric machine and the wheel hubs in a longitudinally and radially compact way with respect to the axis of the drive shafts.

Again, the off-axis configuration makes it possible to comfortably house the electric machine outside the space containing the transmission elements, facilitating their assembly and lubrication.

Lastly, it is clear that modifications and variations may be made to the electric traction axle according to this invention, without however departing from the scope of protection defined by the claims.

Clearly, the epicyclic mechanisms described and the differential unit may be assembled or arranged differently compared to what has been described, as with the other gears and selectors.

Alternatively, the gear change system may be produced with dog clutches, radial ones (with grooves), with clutch elements or with synchroniser elements with respect to what is described above. In particular, "power-shifting" clutches could be used.

Similarly, actuators and wheel hub transfer systems may be produced differently.

In particular, the actuator elements may be produced in various ways, i.e., for example, by means of: pistons, drums, electric actuator linkages, using air or oil, electromagnetic ones, coaxial ones, or remote, rotary, or linear ones, with stable or monostable control, etc.

In addition, the wheel hub reduction systems, if included, may be of the type coaxial between the axis of the drive shafts and the wheels or arranged off-set (spaced apart with parallel axes) producing "Portal" architectures designed to increase the free distance between the axis of the differential unit (and thus of the transmission) and the ground.

Again, it is clear that the embodiments illustrated, as far as mechanically compatible, may be combined together.

The invention claimed is:

1. An electric traction axle for a vehicle comprising at least one electric machine, a pair of drive shafts, and a transmission chain operatively connecting said at least one electric machine to said pair of drive shafts, said transmission chain comprising a first transfer system, a second transfer system, and a differential unit operationally interposed in series between said at least one electric machine and said pair of drive shafts, said drive shafts being coaxial to a longitudinal axis of said axle, said electric machine insisting on an axis parallel and distinct from said longitudinal axis, wherein said second transfer system is of the epicyclic type, comprising a first sun gear a crown connected to a non-rotating portion of said axle and a plurality of satellites meshing between said first sun gear and said crown and connected by a carrier, said carrier being operationally connected to said differential unit, said electric traction axle further comprising at least one speed ratio change system operationally interposed between said first transfer system and said second transfer system, wherein said at least one speed ratio change system is configurable among three operating modes to connect an input shaft with one of said first sun gear or said carrier or to disconnect said input shaft with respect to said second transfer system, said second transfer system comprises a second sun gear, a second plurality of satellites meshing with said second sun gear, said second plurality of satellites being rigidly connected to said plurality of satellites and carried by a same carrier, said at least one speed ratio change system comprises a first sleeve movably carried along said axis by said input shaft and provided with toothing configured to be selectively operationally connected to respective teeth integral with said carrier and said first sun gear respectively;

said at least one speed ratio change system comprises a second sleeve movably carried along said axis by said input shaft and provided with toothing configured to be selectively operationally connected to toothing integral with said second sun gear.

2. The electric traction axle according to claim 1, wherein said electric machine drives an operating shaft operatively connected by said first transfer system to said input shaft carried in a rotationally free manner by one of said drive axles and operationally connected to said second transfer system via said at least one speed ratio change system, said first transfer system being a parallel shaft transfer system defining at least one speed jump between said operating shaft and said input shaft.

3. The electric traction axle according to claim 1, wherein said first sun gear is coaxial to said longitudinal axis.

4. The electric traction axle according to claim 1, wherein said first sleeve is coaxial to said longitudinal axis.

5. The electric traction axle according to claim 1, in which said differential unit comprises a plurality of satellites driven by said second transfer system and meshing with a first and a second bevel gear carried by a respective drive shaft.

6. The electric traction axle according to claim 1, comprising a differential lock system configured to inhibit a torque distribution function of said differential unit.

7. The electric traction axle according to claim 1, further comprising optional wheel hub reduction systems operationally interposed between each wheel and the respective drive shaft.

8. The electric traction axle according to claim 1, further comprising a parking brake system configured to cooperate operationally with at least one of the second transfer system and/or the differential unit to block the movement of said e axle/e-beam electric traction axle.

9. The electric traction axle according to claim 1, comprising a casing suitable for supporting said electric machine, said drive shafts and defining a space separated from the external environment to house said first transfer system, said at least one speed ratio change system, said second transfer system and said differential unit.

10. The electric traction axle according to claim 1, comprising a disconnection system of said drive shafts to allow the disconnection functions of said drive shafts from said transmission chain.

11. A vehicle comprising an electric traction axle according to claim 1.

\* \* \* \* \*